United States Patent [19]
McGourty

[11] 3,881,815
[45] May 6, 1975

[54] PROJECTION TEACHING MACHINE

[76] Inventor: Thomas K. McGourty, 16440 Cox Rd., Aptos, Calif. 95005

[22] Filed: Dec. 11, 1972

[21] Appl. No.: 313,867

[52] U.S. Cl. ............................................... 353/97
[51] Int. Cl. .......................................... G03b 21/14
[58] Field of Search ........................... 353/25–27, 353/97; 35/9 E; 95/36, 37, 68; 355/74, 54, 39

[56] References Cited
UNITED STATES PATENTS

| | | | |
|---|---|---|---|
| 2,334,329 | 11/1943 | Isaacson | 353/97 |
| 3,470,644 | 10/1969 | Craig | 355/74 |
| 3,645,613 | 2/1972 | Brink | 353/25 |
| 3,661,449 | 5/1972 | Wright | 353/97 |

Primary Examiner—Harry N. Haroian
Attorney, Agent, or Firm—Robert G. Slick

[57] ABSTRACT

A teaching machine is disclosed having a unique shutter arrangement whereby a series of pictures can be projected from a single slide and any column or row or combination thereof can be selected by the shutter arrangement.

5 Claims, 10 Drawing Figures

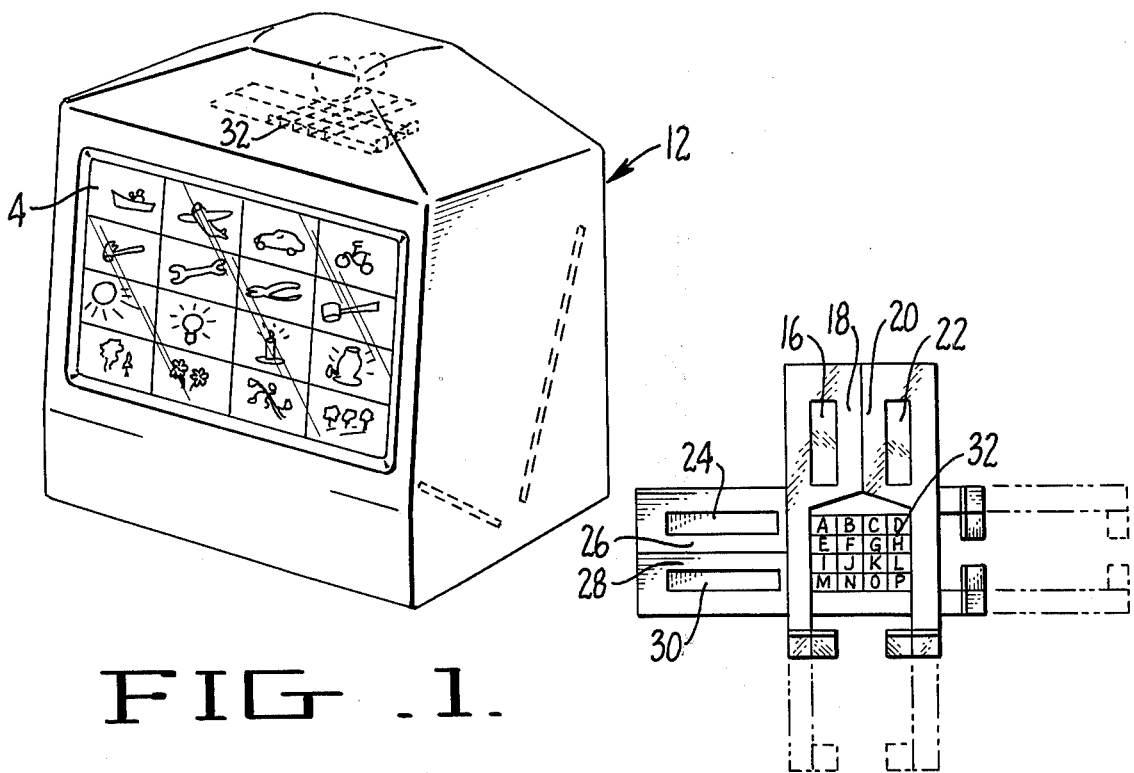
FIG. 1.
FIG. 2.
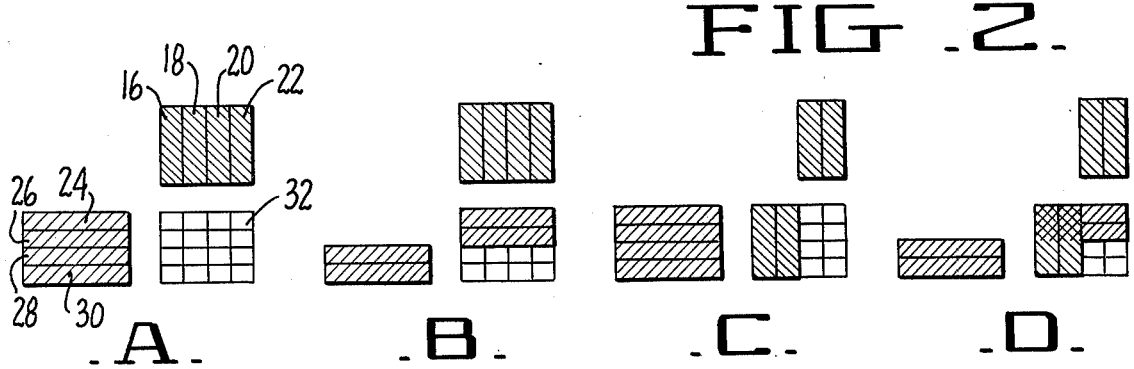
A.   B.   C.   D.
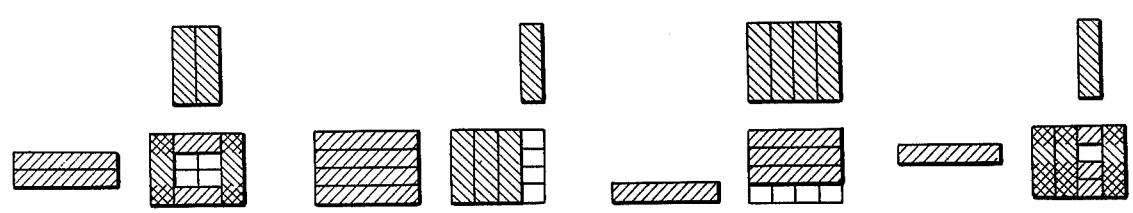
E.   F.   G.   H.
FIG. 3.

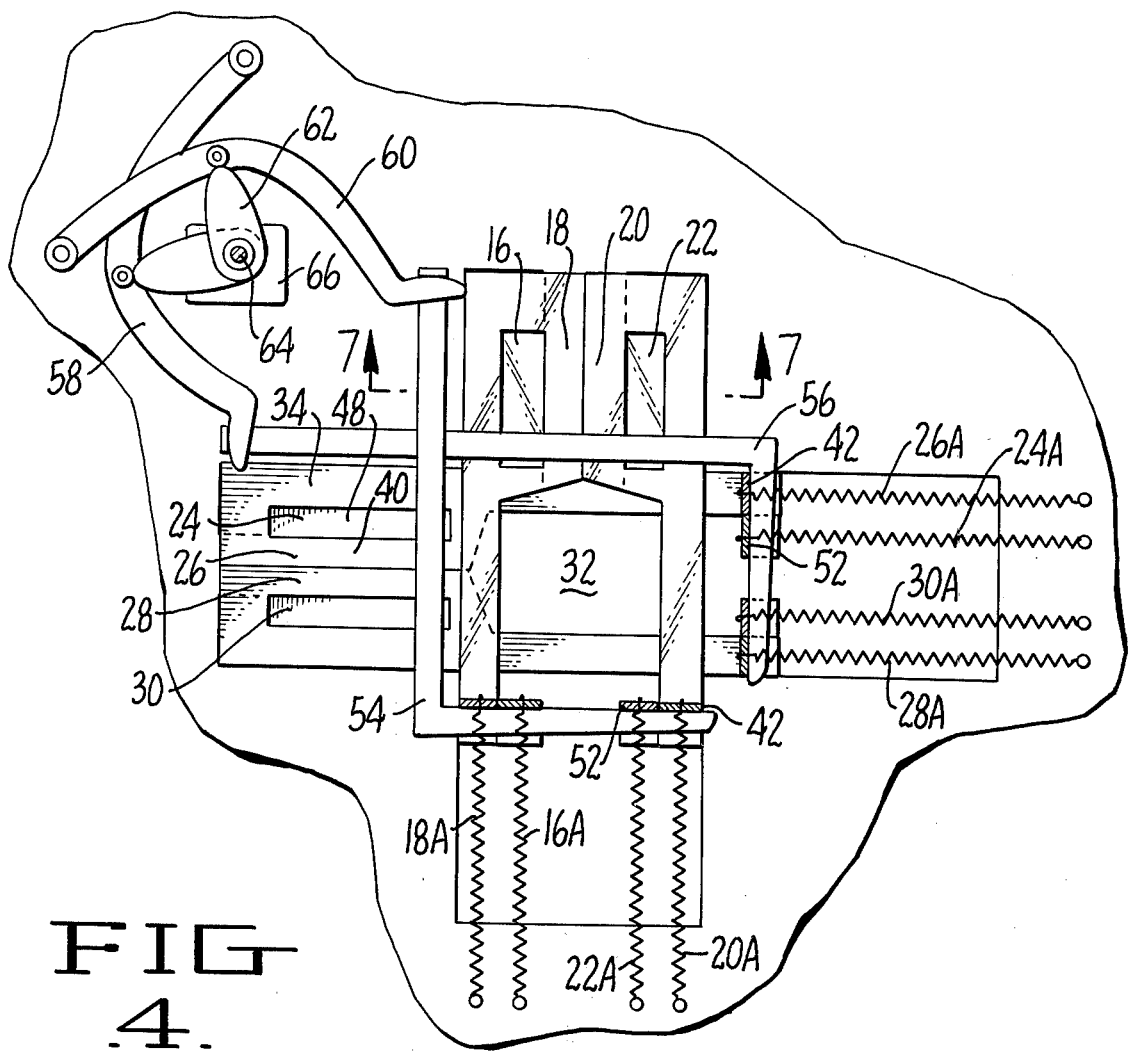
FIG. 4.
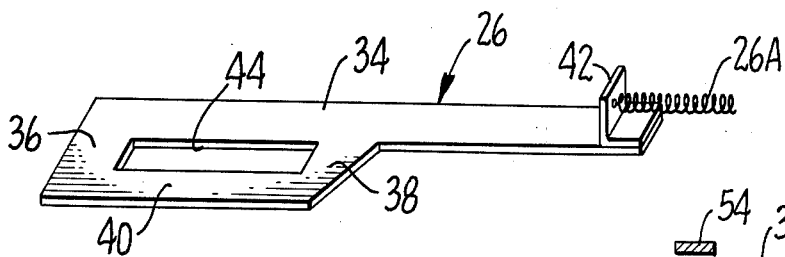
FIG. 5.
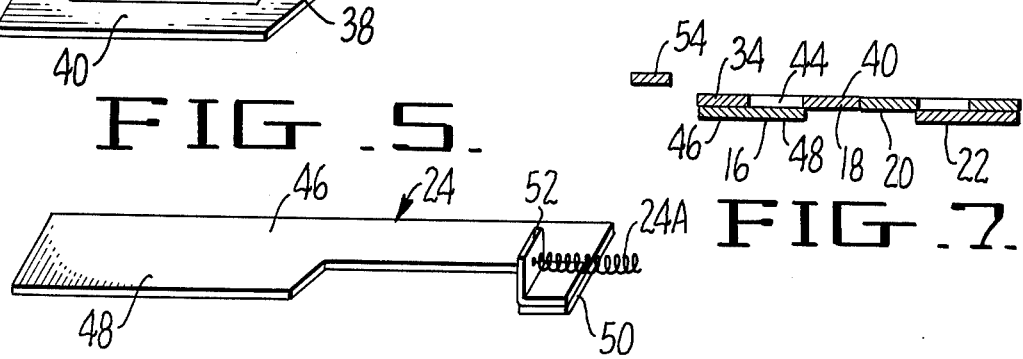
FIG. 6.
FIG. 7.

PROJECTION TEACHING MACHINE

SUMMARY OF THE INVENTION

The present invention relates to a teaching machine wherein a large number of individual pictures or other representations can be placed on a single slide and projected either in groups or singly.

As an example, 16 pictures might be placed on a single slide divided into four rows each row relating to a single subject. The student would then be asked a question with respect to the four pictures and after the student had answered, three of the pictures would be blacked out and only one of the four pictures would be projected to show the correct answer.

The present invention relates broadly to an improved shutter arrangement which lies in the focal plane of a projector and which enables one to project any selected portion of the total slide. As will later appear in detail, any single picture can be projected, any row or column or any particular grouping such as the four middle pictures out of a group of 16.

The shutter structure is extremely thin so it can lie substantially in the focal plane of the slide being projected, yet will not interfere with the condensing or projecting lenses of the projector in any manner.

Another feature of the invention is that the shutter is readily programmable so that it goes from one projection condition to the next very quickly through a series of electrical pulses.

Other features of the invention will be brought out in detail in the balance of the specification.

BRIEF DESCRIPTION OF THE DRAWINGS

FIG. 1 is a perspective view of a projection teaching machine embodying the present invention.

FIG. 2 is a diagrammatic view showing the mode of operation of the unique shutter of the present invention.

FIG. 3 consists of a plurality of diagrams illustrating the versatility of the shutter of the present invention.

FIG. 4 is a plan view of a shutter embodying the present invention.

FIG. 5 is a perspective view of one form of shutter leaf.

FIG. 6 is a perspective view of another form of shutter leaf.

FIG. 7 is a section on the line 7—7 of FIG. 4.

DESCRIPTION OF THE PREFERRED EMBODIMENTS

Figure 8:
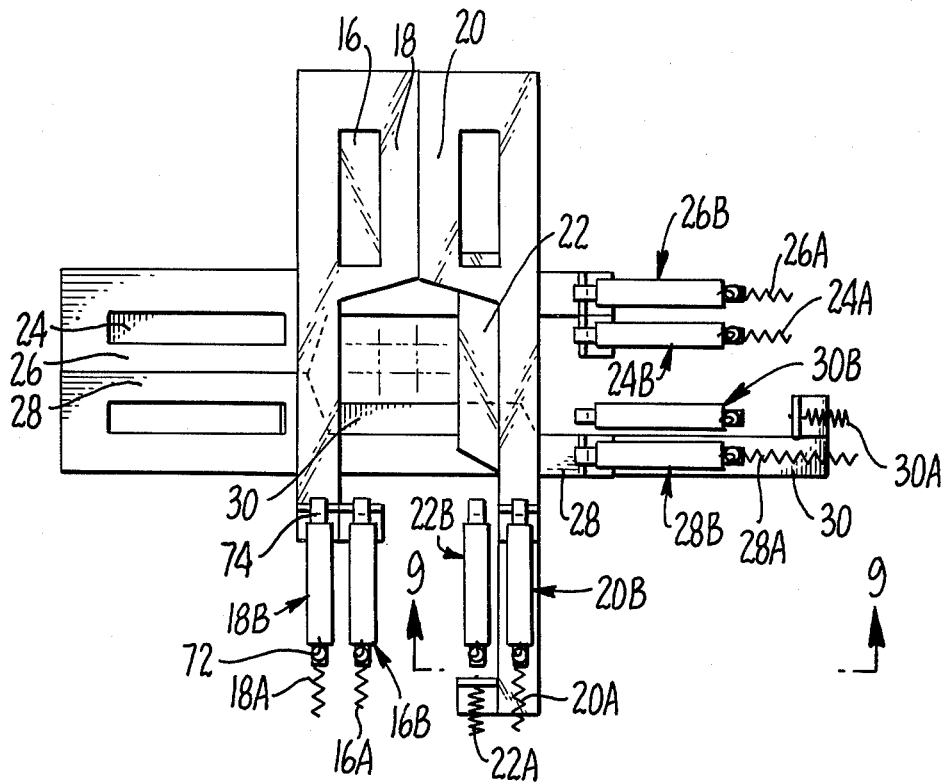
FIG. 8 is a plan view of the shutter showing the magnet assemblies which are utilized to restrain the shutter leaves.

The visual portion of the teaching machine of the present invention is generally designated 12 and is of conventional design and includes a translucent screen 14 for viewing images projected from a slide 16. Mounted directly above the slide is the shutter mechanism which constitutes the gist of the present invention and which includes eight sliding shutter leaves. The shutter leaves are arranged in four rows and four columns so that each leaf is capable of occulting one entire row or one entire column.

The operation of these leaves is shown diagrammatically in FIG. 3 wherein the individual column leaves are designated 16, 18, 20, and 22 while the row leaves are designated 24, 26, 28 and 30. The slide to be projected has been generally designated 32. If all eight of the leaves are held back as at 3A, the entire screen is illuminated. If the lower two row leaves are held back and all of the column leaves are held back as at 3B, the lower half of the screen is illuminated. Similarly, if only the two column leaves and all of the row leaves are held back as at 3C, the right half of the screen will be illuminated. In 3D the leaf configuration is shown for illuminating the lower right hand quarter of the screen while at 3E the center quarter of the screen is illuminated. At FIGS. 3F, G and H are shown respectively the illumination of the right column, the bottom row and a single frame, respectively. It can thus be seen with this shutter arrangement, one can illuminate any portion of the screen which is desired. Since the row leaves or the column leaves are alone capable of occulting the entire screen it is obvious that at least one row leaf and at least one column leaf must be held back to illuminate a picture.

As an example then as to how the device might be used, there is shown in FIG. 1 a top row having a picture of a ship, an airplane, a car and a tricycle. All of these have to do with transportation. In use, the top row might be illuminated and a child asked: "Which vehicle travels through the air?" Hopefully the child would point to the airplane but, in any event, after choosing an answer, either through a timing mechanism or a device actuated by the child, the first, third and fourth pictures would be extinguished, leaving only the correct answer, namely the airplane. Thus, the teaching device serves as an award for the child to make the correct answer and an admonishment if an incorrect answer is chosen. In the example it will be seen that the subsequent rows relate to single subjects such as tools, lights and plants and that the columns relate to various categories within these classes.

The leaves themselves are made of thin steel and are employed in pairs. Since the four pairs of leaves are either mirror or rotational images of each other, only one pair is described in detail. The leaves themselves can best be seen in FIGS. 5 and 6. The leaf 26 has a side member 34 which serves to support and guide the leaf and two arms 36 and 38 support arm 40 which is the actual element which moves over the slide to obscure it. At one end of arm 34 is an upturned tab 42 for actuating the leaf as is later described in detail. The center opening 44 serves to let light pass through so that this leaf will not interfere with the operation of its mating leaf as shown in FIG. 6. It is obvious that the arm 40 occupies the space shown by slide 26 in FIG. 3A. In other words, it is the function of this leaf to obscure or reveal the second row.

In FIG. 6 is shown the slide which is the equivalent of 24 in FIG. 3A, i.e. the slide which obscures or reveals the first row. This slide has an arm 46 to which is attached projection 48 which forms the actual light obscuring member. This slide has an inturned end at 50 with an upturned tab 52.

The relationship of the two slides just described can best be seen in FIGS. 4 and 7; leaf 26 is mounted over the leaf 24 so that the arms 34 and 46 lie adjacent to each other and can slide back and forth with relationship to each other while tabs 42 and 52 extend upwardly in side by side relationship so that they can be used to actuate the two leaves individually. Obviously either leaf could be on top. When the two slides are superimposed, the extension 48 closes the space 44 while the arm 40 extends beyond 48. Thus, that portion which is designated 48 serves to obscure the first row, while 40 serves to obscure the second row. The two leaves which lie directly below those just described, namely, 28 and 30 are mirror images of the two leaves just described. Similarly, leaves 16, 18, 20 and 22 are rotational images of the four leaves 24–30.

As was previously stated, the leaves are mounted in sliding relationship so that each can individually slide over and occult one row or one column. Normally the leaves are biased to the closed position by means of eight springs which are designated by the letter A and the number of the corresponding leaf. These springs tend to close all of the shutter leaves. The leaves are opened by two L-shaped arms 54 and 56 bearing against the leaf tabs in a lost motion relationship, i.e. the leaves are forced open by the arms, but only the springs cause the leaves to return. Arms 54 and 56 are actuated by cam followers 58 and 60 which bear against the cam arms 62. The cam arms 62 are mounted on shaft 64 on motor 66. Motor 66 has a latching switch therein, of conventional-type so not illustrated and each time the motor receives an electrical pulse, the motor will continue to operate for one complete revolution and then shut off. During this one complete revolution, the leaves, if not restrained, will completely open and then close.

Figure 9:
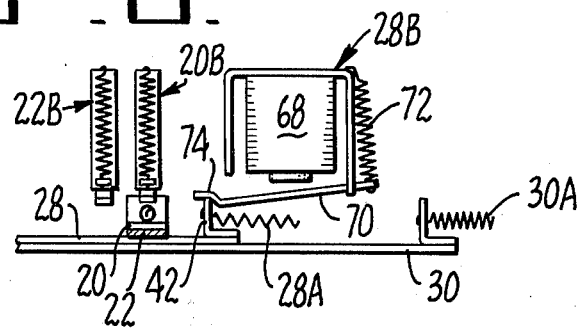
FIG. 9 is a section on the line 9—9 of FIG. 8.
Figure 10:
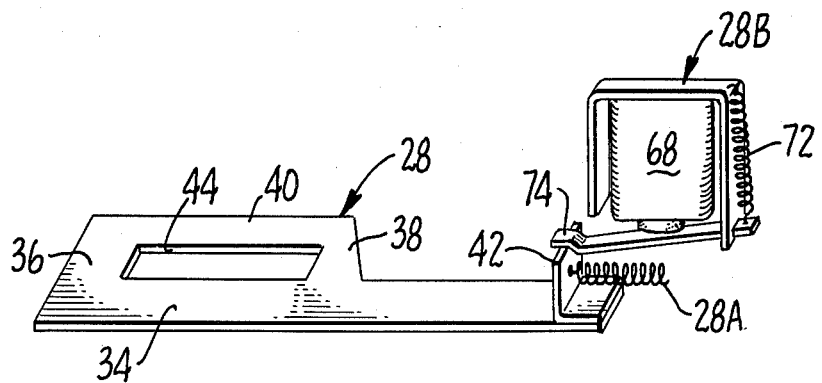
FIG. 10 is a perspective view of a shutter leaf and restraining magnet.

The selected leaves are held in open position by ratchet and magnet assemblies which in the drawing are designated by the number of the leaf which is controlled followed by the letter B. The operation of these assemblies can best be seen in FIGS. 9 and 10. Electromagnet 68 has an armature 70 which is normally held in an extended position by spring 72. The end of the armature 70 has a detent or ratchet 74 adapted to engage one of the upstanding tabs such as 29 on leaf 28. If a given electromagnet is energized and motor 66 is cycled, the shutter leaf can go freely through a complete opening and closing operation each time motor 66 is cycled. However, if the magnet is not energized, spring 72 causes armature 70 to swing downwardly and as the leaf opens, it will engage detent 74 on tab 29 so that as the arms 54 and 56 retract, that particular leaf 28 will remain open as is shown in FIGS. 8 and 9, because of the lost motion between the arms 54 and 56 and the tabs on the shutter leaves. Thus, to expose any desired portion of the picture, it is only necessary to cycle the motor 66 and to energize the proper electromagnets to permit those leaves of the shutter to return to the occulting position and while those leaves which are engaged will be retained in the open position until the motor is again cycled. Thus, any desired combination of exposure can be obtained merely by cycling the motor and pulsing the magnets at the desired times.

Many changes can be made in the exact structure without departing from the spirit of this invention. For instance, electromagnet means have been shown for restraining the shutters but other restraining forms can be used. The leaves themselves have been shown as generally L-shaped structures which is a preferred form since rigid mechanical support is provided for each of the leaves regardless of its sliding position. Obviously other forms of sliders could be used. The invention has been described as having two sets of shutters, each with four leaves. Other numbers of leaves can be employed and it is not necessary that each shutter have the same number of leaves.

I claim:

1. A focal plane shutter, said shutter comprising in combination:
   a. means defining a focal plane,
   b. a first pair of leaves, each leaf of which is mounted in side-by-side sliding relationship at one side of the means for defining the focal plane, each of which leaves is capable of occulting a rectangular area of the focal plane when in an extended position, and permitting light to pass through said focal plane when in a retracted position,
   c. a second pair of leaves of substantially the same configuration as said first pair, said second pair being mounted at right angles to said first pair and also at one side of the means defining the focal plane,
   d. means for selectively activating leaves of said first and second pairs of leaves to reveal a desired area of said focal plane, and
   e. each of said leaves having a sliding member mounted on one edge thereof and having a light obscuring member extending from said sliding member including means whereby said leaves are supported throughout their entire lengths by said sliding member.

2. The structure of claim 1 wherein each of said leaves has an upstanding tab thereon and a spring mounted to normally close said leaf and having cam actuated means whereby all of said leaves can be opened by said cam.

3. The structure of claim 2 wherein each of said leaves is provided with a ratchet member whereby said ratchet member can selectively engage a leaf and retain it in the open position.

4. The structure of claim 3 wherein said ratchet members are actuated by an electromagnet.

5. A focal plane shutter in accordance with claim 1 having in combination therewith:
   a. a first set of leaves having tabs on each leaf and springs tending to keep each of said leaves in a closed position,
   b. a second set of leaves at right angles to the first set having tabs thereon and each having a spring tending to hold each leaf in a closed position,
   c. first and second pivoted arms having a lost motion connection between the respective tabs on said sets of leaves whereby moving said arms against said tabs will open said shutter leaves and wherein only said springs tend to open said leaves,
   d. means for actuating said arms through an opening and closing cycle,
   e. individual ratchet means mounted adjacent each of said tabs, said ratchet means having a detent thereon adapted to hold a leaf in the open position, and
   f. means for actuating each of said individual ratchet means whereby selected leaves are retained in the open position when said arms are cycled through an opening and closing operation.

* * * * *